United States Patent
Wright (10) Patent No.: US 9,464,441 B2
(45) Date of Patent: *Oct. 11, 2016

(54) PANEL MOUNTING APPARATUS AND SYSTEM

(71) Applicant: LAMINATORS INCORPORATED, Hatfield, PA (US)

(72) Inventor: John T. Wright, Harleysville, PA (US)

(73) Assignee: LAMINATORS INCORPORATED, Hatfield, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/658,884

(22) Filed: Mar. 16, 2015

(65) Prior Publication Data

US 2015/0184372 A1   Jul. 2, 2015

Related U.S. Application Data

(63) Continuation of application No. 13/278,980, filed on Oct. 21, 2011, now Pat. No. 9,091,079.

(60) Provisional application No. 61/405,975, filed on Oct. 22, 2010.

(51) Int. Cl.
| | |
|---|---|
| *E04B 2/88* | (2006.01) |
| *E04B 1/41* | (2006.01) |
| *E04B 1/38* | (2006.01) |
| *E04F 13/08* | (2006.01) |

(52) U.S. Cl.
CPC ............ *E04F 13/0816* (2013.01); *E04B 1/40* (2013.01); *E04F 13/0846* (2013.01); *E04F 13/0875* (2013.01); *E04F 13/0898* (2013.01); *E04B 2001/405* (2013.01); *Y10T 403/42* (2015.01)

(58) Field of Classification Search
CPC ............ E04F 13/0816; E04F 13/0846; E04F 13/0875; E04F 13/0898
USPC ........ 52/235, 489.1, 506.01, 506.06, 506.08, 52/510, 512, 586.1, 747.1, FOR. 148
See application file for complete search history.

(56) References Cited

U.S. PATENT DOCUMENTS

| | | | | |
|---|---|---|---|---|
| 3,073,420 | A | | 1/1963 | Olsen |
| 4,307,551 | A | * | 12/1981 | Crandell ........................ 52/235 |
| 4,483,122 | A | | 11/1984 | Crandell |
| 4,625,481 | A | * | 12/1986 | Crandell ........................ 52/235 |
| 4,866,896 | A | | 9/1989 | Shreiner et al. |
| 5,058,344 | A | | 10/1991 | Biebuyck |
| 5,076,035 | A | | 12/1991 | Wright |
| 5,094,051 | A | * | 3/1992 | Miller ............................ 52/235 |
| 5,544,461 | A | | 8/1996 | Sommerstein |
| 5,893,245 | A | | 4/1999 | Sekiguchi et al. |
| 6,330,772 | B1 | | 12/2001 | Mitchell et al. |
| 6,484,465 | B2 | * | 11/2002 | Higgins ......................... 52/474 |
| 6,588,165 | B1 | | 7/2003 | Wright |
| 7,472,521 | B2 | | 1/2009 | Bilge |
| 7,516,583 | B2 | | 4/2009 | Mitchell |
| 7,621,084 | B2 | | 11/2009 | Bilge |
| 7,716,891 | B2 | | 5/2010 | Radford |

(Continued)

*Primary Examiner* — Rodney Mintz
(74) *Attorney, Agent, or Firm* — Oblon, McClelland, Maier & Neustadt, L.L.P.

(57) ABSTRACT

A mounting apparatus for mounting a panel to a structure. The mounting apparatus includes a panel extrusion that attaches to a back side of the panel such that the panel extrusion is obscured behind the panel in order to show a clean surface look. A connector extrusion secures the panel extrusion to the structure for simple construction.

19 Claims, 10 Drawing Sheets

(56) References Cited

U.S. PATENT DOCUMENTS

| | | |
|---|---|---|
| 7,743,575 B2 | 6/2010 | Ito |
| 7,805,899 B2 | 10/2010 | Montgomery |
| 7,810,289 B2 | 10/2010 | Montgomery |
| 7,937,902 B1 | 5/2011 | Smith et al. |
| 8,033,066 B2 | 10/2011 | Griffiths |
| 8,127,507 B1* | 3/2012 | Bilge ............................ 52/235 |
| 8,240,099 B2 | 8/2012 | Hummel, III |
| 8,484,916 B2* | 7/2013 | Farag ............................ 52/235 |
| 8,745,941 B2 | 6/2014 | Macdonald et al. |
| 8,769,901 B2 | 7/2014 | Todd et al. |
| 8,833,015 B2 | 9/2014 | Bilge |
| 8,925,271 B1 | 1/2015 | Bilge |
| 8,966,849 B1* | 3/2015 | Bilge ....................... 52/506.05 |
| 9,091,079 B2* | 7/2015 | Wright ............... E04F 13/0816 52/235 |
| 9,359,772 B2* | 6/2016 | Prica ..................... E04F 13/083 52/483.1 |
| 2002/0124514 A1* | 9/2002 | Higgins .................. 52/506.06 |
| 2006/0179744 A1* | 8/2006 | Lynch et al. ................. 52/235 |
| 2008/0134594 A1 | 6/2008 | Ness |
| 2009/0145071 A1 | 6/2009 | Radford |
| 2009/0241444 A1* | 10/2009 | Griffiths ........................ 52/235 |
| 2009/0241451 A1 | 10/2009 | Griffiths |
| 2010/0037549 A1* | 2/2010 | Lynch et al. .............. 52/506.08 |
| 2010/0263314 A1 | 10/2010 | Macdonald et al. |
| 2011/0252731 A1 | 10/2011 | Boyer et al. |
| 2012/0017530 A1* | 1/2012 | Hummel, III ............. 52/506.05 |
| 2012/0085042 A1* | 4/2012 | Macdonald et al. ......... 52/173.3 |
| 2012/0096799 A1* | 4/2012 | Wright ........................... 52/578 |
| 2012/0186170 A1* | 7/2012 | Macdonald ......... E04F 13/0805 52/173.3 |
| 2013/0312356 A1 | 11/2013 | Foral |
| 2015/0308123 A1* | 10/2015 | Prica .................. E04F 13/0801 52/483.1 |
| 2015/0345152 A1* | 12/2015 | Libreiro ............. E04F 13/0816 52/506.05 |

* cited by examiner

PANEL MOUNTING APPARATUS AND SYSTEM

CROSS-REFERENCE TO RELATED APPLICATIONS

This application is a continuation application of and claims the benefit of priority under 35 U.S.C. §120 of U.S. application Ser. No. 13/278,980, filed Oct. 21, 2011, and claims the benefit of priority under 35 U.S.C. §119(e) of U.S. Provisional Application No. 61/405,975, filed Oct. 22, 2010, and the entire contents of each of the above are incorporated herein by reference.

BACKGROUND

1. Field

The embodiments discussed herein relate to a panel mounting system. More specifically, a system of extrusions for attaching panels to a building is described.

2. Description of the Related Art

Generally, a mounting system for mounting metal skin exterior panels on structural members of a building must have four basic characteristics: (1) load carrying capability to support the panels without substantial deformation; (2) adjustability to facilitate attachment of the panels to the structural members; (3) tight sealing to minimize infiltration of wind, rain, snow, hail and the like; and (4) removability to allow removal of any panel and/or seal member without disturbing others. However, it is known that the wall panels are widely used to create a finished, durable, and aesthetic appearance on building walls of all types, as well as for panels for truck bodies, shipping containers, and the like. The panels are typically formed as laminates of outer surface sheets bonded to inner core layer or layers that have structural strength and rigidity, yet are light-weight, flexible under building and environmental stresses, and attractive for the external or interior appearance of building walls.

The panels are mounted to building walls by various types of mounting devices. For example, one-piece channel-shaped extrusions of metal or rigid plastic are widely used to retain the panels at joints and corners. With conventional extrusion designs, installation proceeds progressively by first installing a corner or terminal extrusion, then a panel, then an "H" (straight, two-sided) extrusion, then another panel, and so on until another corner of termination is reached. Installers must be able to size the panels, position the mounting extrusions, and form joints that are properly aligned and cleanly formed.

However, conventional mounting systems using extruded devices have been rather inconvenient to use and expensive. With one-piece extrusions, installation proceeds in one direction along a building wall, and caulking the gaps between the panel edges and the extrusions must be done at the time of installation. If the panels are misaligned or a panel becomes damaged, the panels must be removed in sequence in the backward direction. An individual panel cannot be removed out of sequence. The already-installed caulking must be removed or it will detract from the clean appearance of the panels. With one-piece extrusions, the panel fitting and caulking must be done correctly when first installed. Installers may be tempted to leave out the caulking to facilitate panel repair or removal, but this can lead to panel and building failure due to water seepage through the gaps and into the building walls.

Additionally, extrusions in conventional mounting systems typically include a flange or extension that surrounds or overlaps the outer perimeter of the panel to retain and secure the panel to the building or other body to which the panel is mounted. For example, the outer perimeter of the panels may be inserted into a slot or groove of the extrusion so that one wall of the slot or groove is visible on the exterior of the mounted panel. The walls of the slot may be somewhat flexible and are typically spaced for the thickness of the panel. Another conventional mounting system includes multiple components, where the back of the panel is placed against a first component attached to the wall and then a second component snaps into the first component at a joint between adjacent panels. However, this second component includes an extension that overlaps the outer perimeter of the panel, such that a portion of the mounting system is again visible at the exterior edges of each panel section.

Thus, conventional mounting systems such as those described above do not provide a clean, planar surface for the exterior faces of the mounted panels because the flange or the extension securing the edge of the panels is raised from the panel edge and may be of a noticeably different color.

Furthermore, due to the variety of sill flashings, head flashings, and parapet flashings, which are often provided by the various door and window manufacturers, conventional mounting systems are not always compatible with the various flashings and can be troublesome for installers arriving at the jobsite with no directions on how to handle the intersection of two different building materials.

SUMMARY

One exemplary embodiment of the present invention provides a mounting apparatus for mounting a panel to a structure. The mounting apparatus includes one or more panel extrusions that attaches to a back side of the panel such that the panel extrusions are obscured behind the panel. A connector extrusion secures the panel extrusions to the structure.

Another exemplary embodiment of the present invention provides a mounting system for mounting panels to a structure. The mounting system includes an air and water barrier layer, a strip of foam tape disposed on the air and water barrier layer, and a panel assembly. The panel assembly includes a panel and one or more panel extrusions attached to a back side of the panel such that the panel extrusions are obscured behind the panel. A connector extrusion secures the panel assembly to the structure. The connector extrusion is disposed on the strip of foam tape to achieve leveling and seals.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by the specification and drawings are defined by the words of the accompanying claims.

DETAILED DESCRIPTION

In the following, the present advancement will be discussed by describing a preferred embodiment with reference to the accompanying drawings. However, those skilled in the art will realize other applications and modifications within the scope of the disclosure as defined in the enclosed claims.

Figure 1:
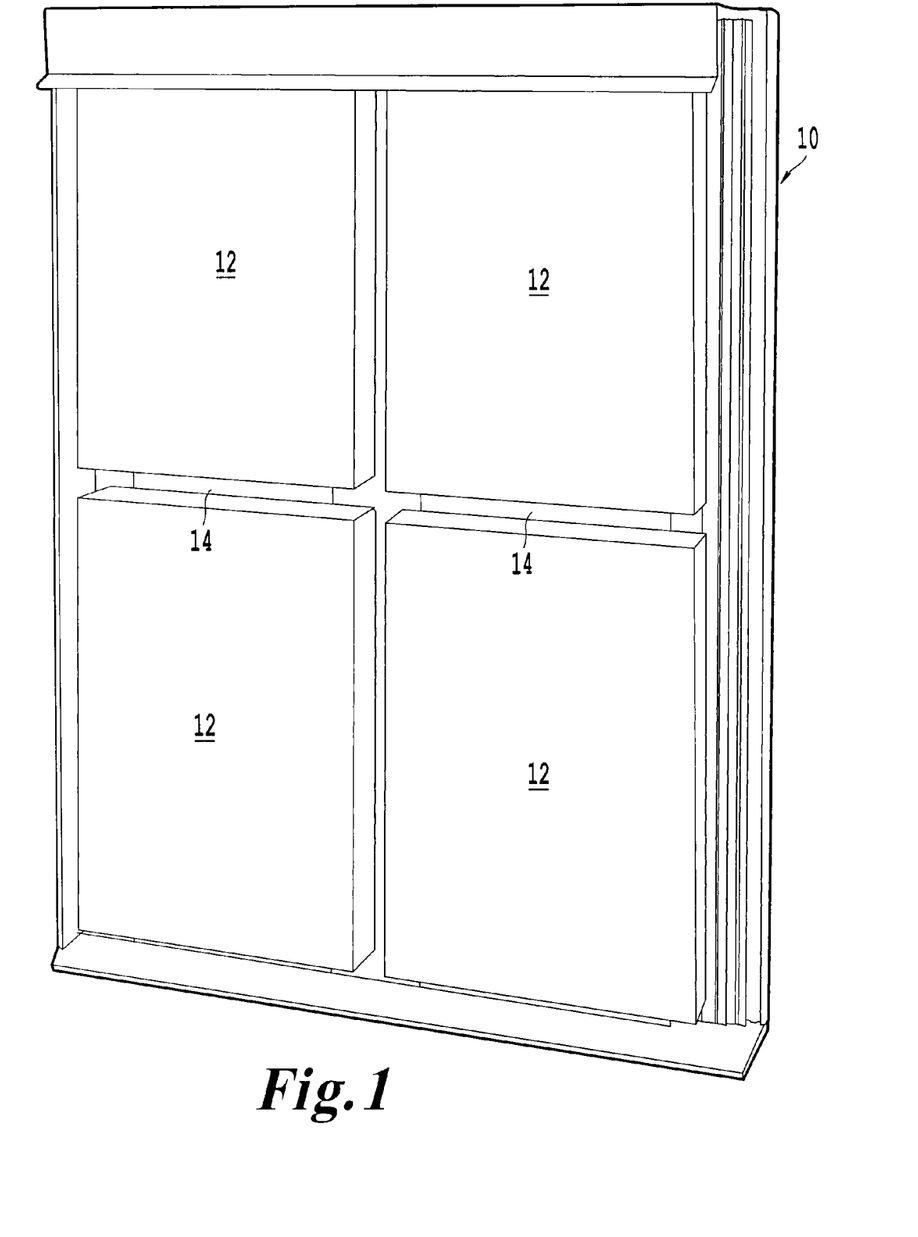
FIG. 1 is an external perspective view of an installed mounting system according to an exemplary embodiment of the invention.

FIG. 1 is a perspective view of a finished wall 10 with panels 12 mounted using the mounting system described herein. The panels 12 are typically mounted using only three specialized extrusions (not all shown in FIG. 1). The panels 12 and insert strips 14 obscure the extrusions so there is a clean look to the finished wall 10. In one non-limiting embodiment, it is preferable to use a panel having a corrugated core laminated between two metallic sheets (see FIG. 8). When properly installed, the mounting system provides at least five seals that trap and drain water to the outside of the structure. The five seals are discussed in detail below.

Figure 2:
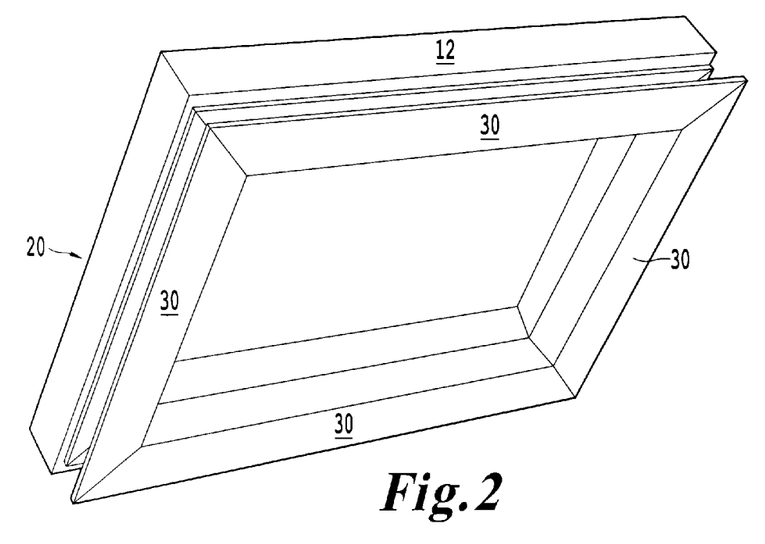
FIG. 2 is a perspective view of the back side of a panel assembly according to an exemplary embodiment of the invention.

FIG. 2 depicts a completed panel assembly 20 from the back side. A panel assembly includes the panel 12 and panel extrusions 30. The panel extrusions 30 are visible from the back side of the panel assembly 20, however, after installation, the panel 12 obscures the panel extrusions 30, as discussed above. Once a panel assembly 20 is installed by securing it to a structure, insert strips 14 are placed adjacent to panel edges to obscure the connector extrusions 40 (see FIG. 3).

Figure 3:
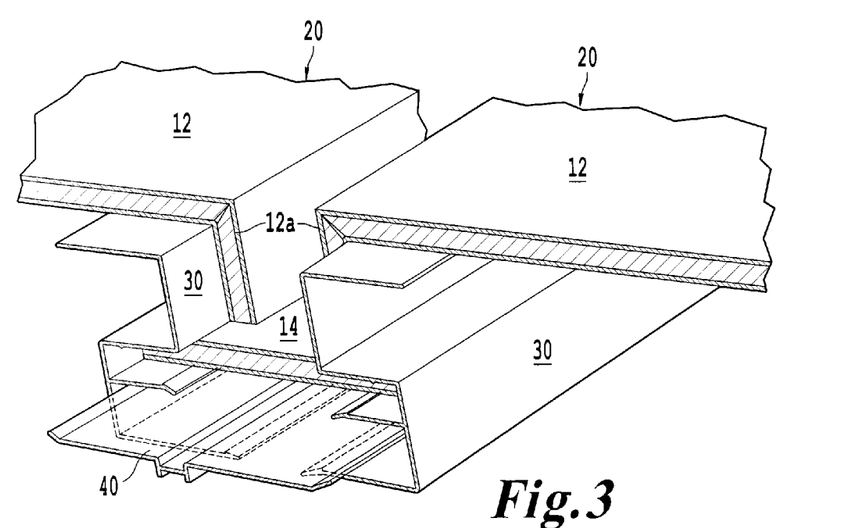
FIG. 3 is a perspective view of a cross-section of the mounting system according to an exemplary embodiment of the invention.

FIG. 3 shows a perspective view of the junction between adjacent panel assemblies 20. For clarity and to avoid obscuring the lines on the figure, the connector extrusion 40 is shown raised in the gutter space between the panel extrusions 30. When installed, however, the connector extrusion 40 secures the panel extrusions 30 to the structure. As mentioned above, the insert strip 14 is disposed between the two panel extrusions 30 to hide the connector extrusion 40.

Figure 4:
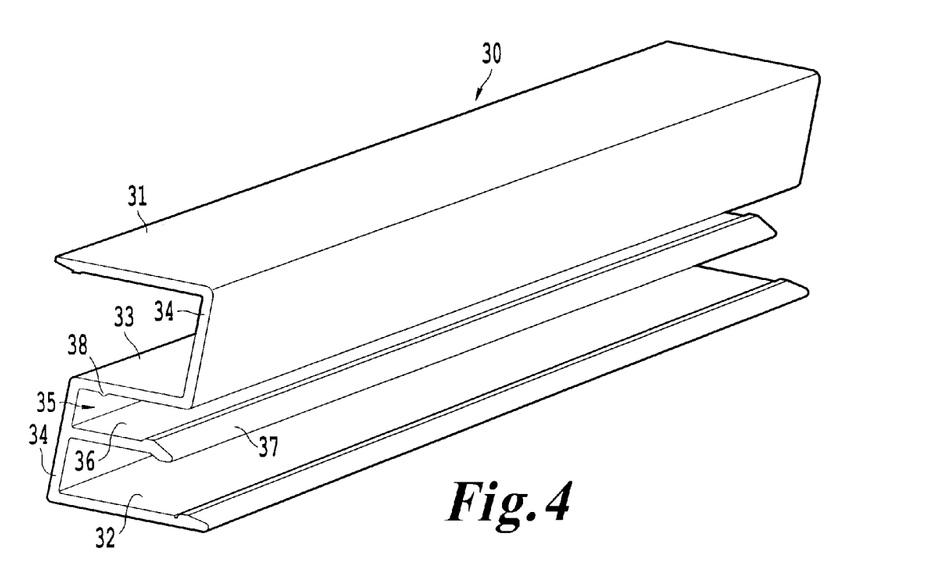
FIG. 4 is a perspective view of a panel extrusion according to an exemplary embodiment of the invention.
Figure 6:
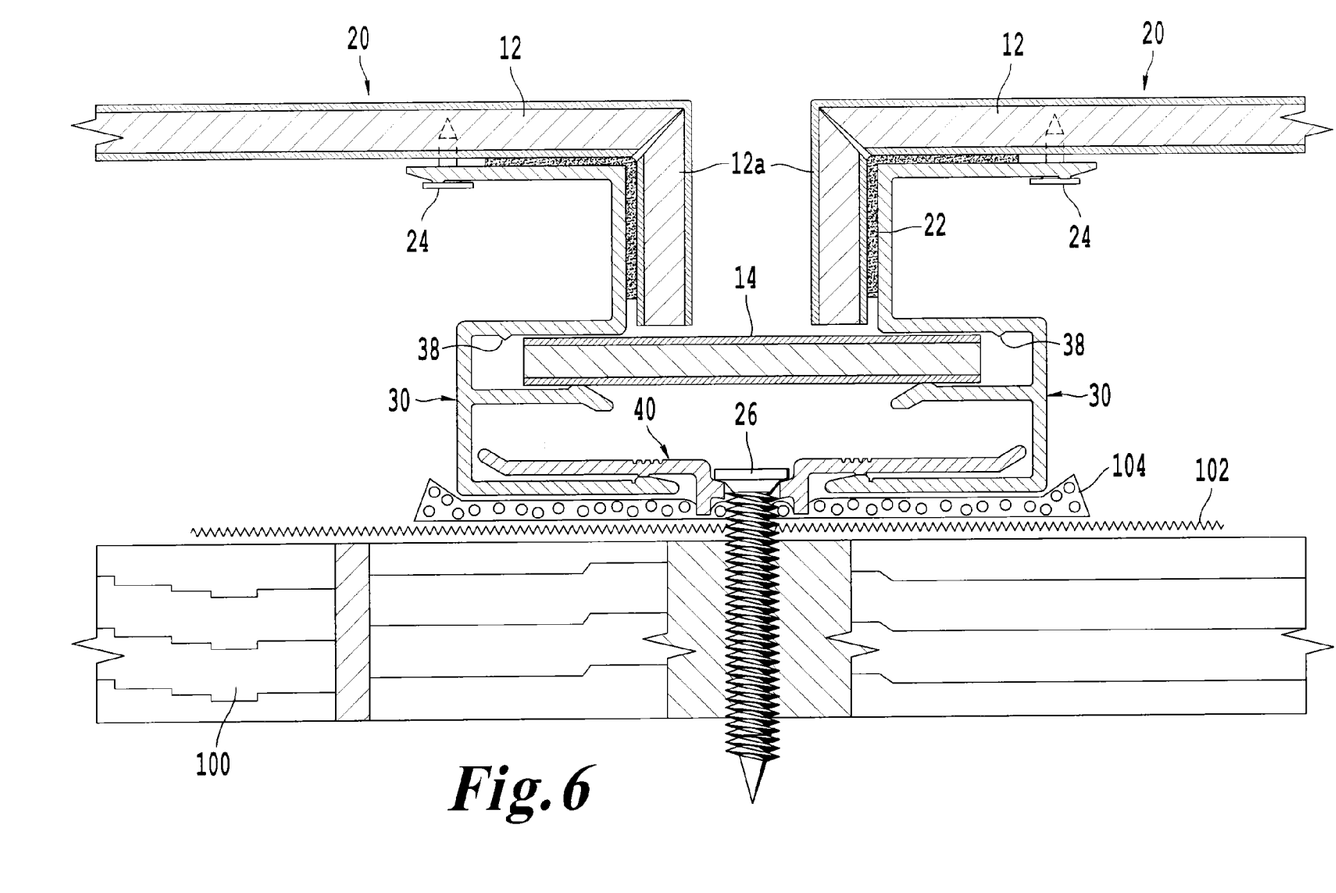
FIG. 6 is a cross-sectional view of two adjacent panel assemblies mounted to a structure according to an exemplary embodiment of the invention.
Figure 7:
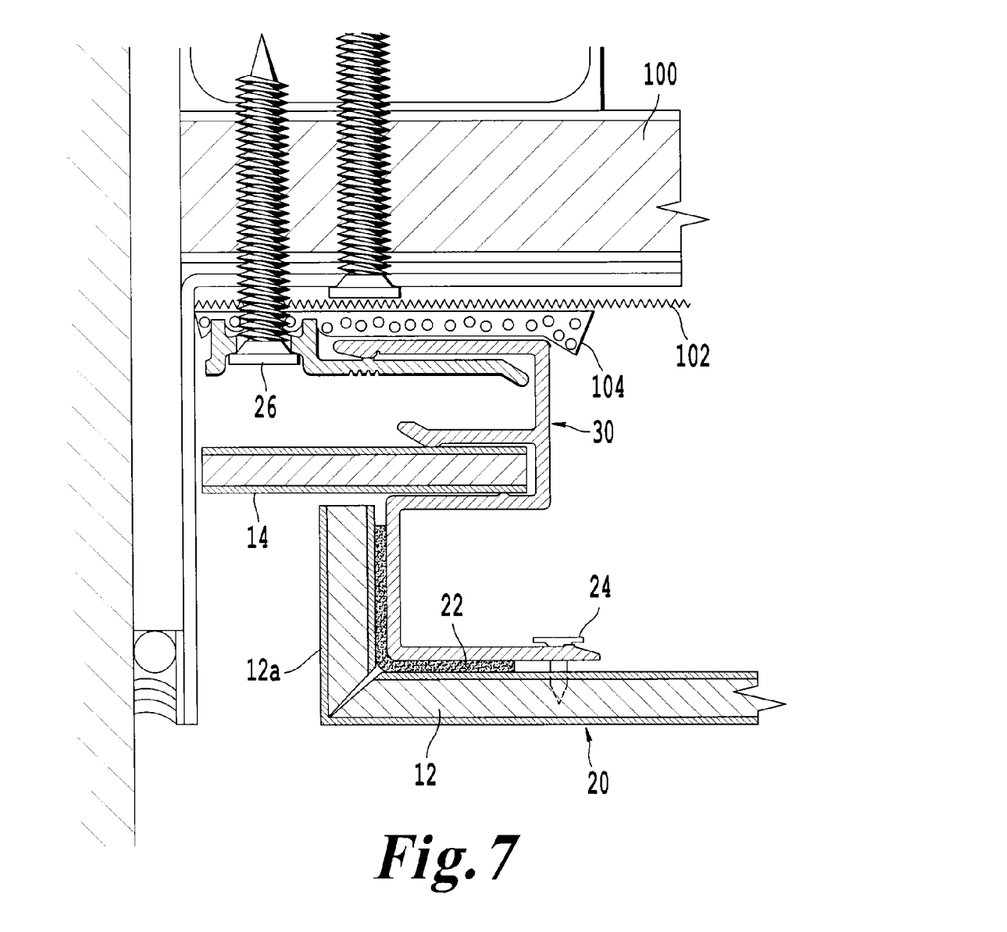
FIG. 7 is a cross-sectional view of an end run of a panel assembly mounted to a structure according to an exemplary embodiment of the invention.

A perspective view of a panel extrusion 30 is shown in FIG. 4. The following description of the features of the panel extrusion 30 is discussed in relation to the disposition of the panel extrusion as shown in FIGS. 6 and 7. The panel extrusion 30 is typically formed as a single extruded piece and then cut according to the required lengths. The panel extrusion 30 includes: an intermediate portion 33, extensions 34, a panel-side flange 31, a structure-side flange 32, and an insert strip flange 36.

When the panel extrusion 30 is installed, the panel-side flange 31 is secured to the panel 12 in the panel assembly 20, and the structure-side flange 32 is secured to the wall 100 of the structure. Although one of ordinary skill in the art will recognize that other shapes and positions may be used for the flanges 31 and 32, in the non-limiting embodiment shown in FIGS. 4, 6, and 7, the flanges 31 and 32 are substantially flat and extend from respective extensions 34 in opposite directions. It is preferred that the structure-side flange 32 extends in a direction outward from the panel 12 so as to engage with the connector extrusion 40 and to be secured to the wall 100. The extensions 34 extend from opposite ends of the intermediate portion 33 in opposite directions, thereby adjoining the flanges 31 and 32 to the intermediate portion 33.

The panel extrusion 30 also includes an insert strip holding portion 35. In one non-limiting embodiment, the insert strip holding portion 35 is a slot having an opening that is approximately the same width or smaller than the thickness of an insert strip 14. The slot of the insert strip holding portion 35 is delimited by the insert support flange 36, the extension 34, and the intermediate portion 33. In particular, the insert support flange 36 extends from the extension 34 adjacent to the intermediate portion 33 in a direction such that, when the panel extrusion 30 is installed, the insert strip holding portion 35 opens outward so as to receive an insert strip 14.

As seen in FIGS. 6 and 7, the majority of the insert support flange 36 is substantially parallel to the intermediate portion 33, however, it is understood that one of ordinary skill in the art could alter the position and/or shape of the insert support flange 36 to another angle, so long as the opening of the slot remains substantially the same width or smaller than the thickness of the insert strip 14. Further, an end portion 37 of the insert support flange 36 may be angled so that it is not co-planar with the majority of the insert support flange 36. Additionally, it is preferable that the end portion 37 of the insert support flange 36 is angled in a direction away from the intermediate portion 33, which may ease insertion of the insert strip 14 into the insert strip holding portion 35.

Furthermore, the panel extrusion 30 includes a raised ridge 38 that runs the length of the intermediate portion. Depending on the width of the insert strip 14, the ridge 38 may assist in securing the insert strip 14 to the panel extrusion 30, as shown in FIG. 7.

Figure 5A:
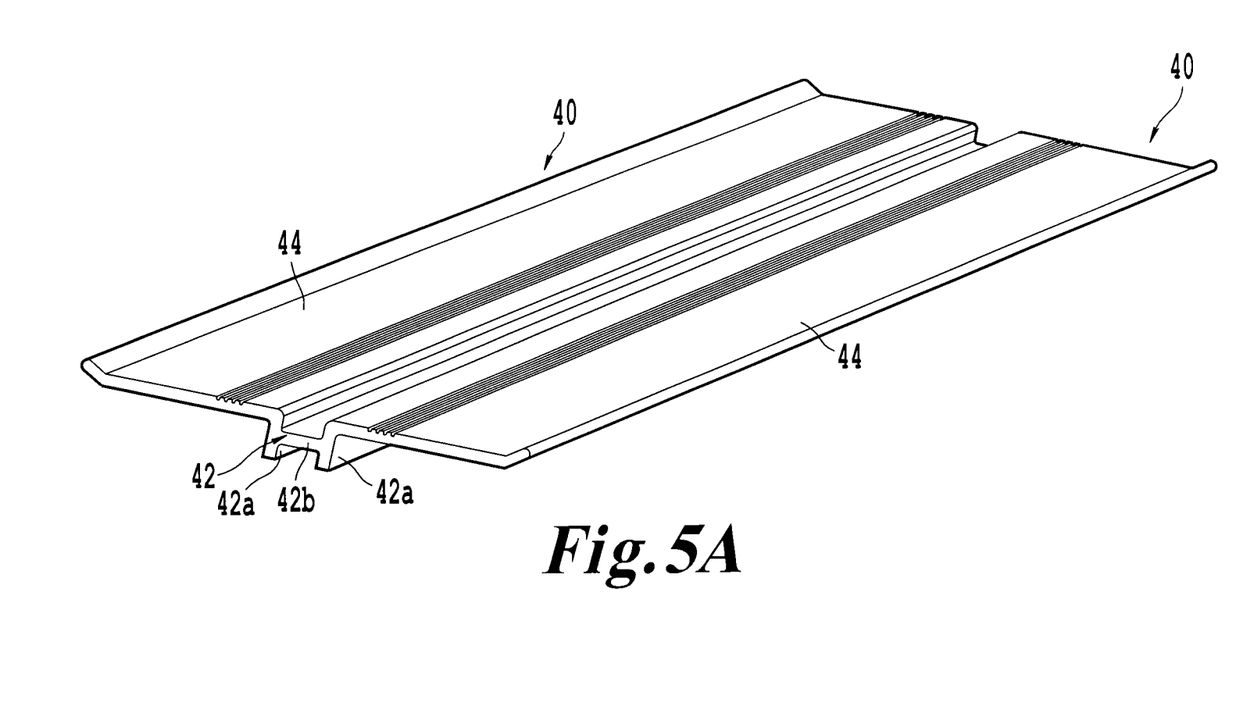
FIG. 5a is a perspective view of a connector extrusion according to an exemplary embodiment of the invention.
Figure 5B:
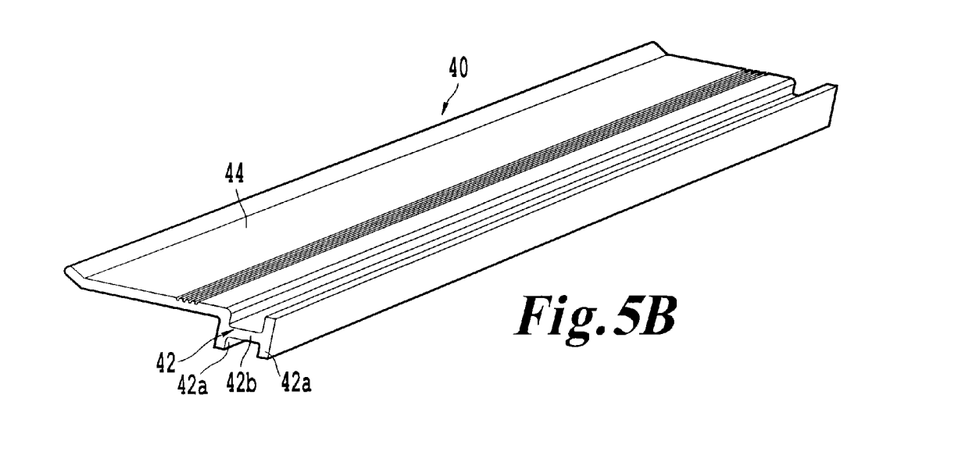
FIG. 5b is a perspective view of an end-of-run connector extrusion according to exemplary embodiment of the invention.

The following description of the features of the connector extrusion 40 is discussed in relation to the position of the connector extrusion as shown in FIGS. 6 and 7. There are two versions of the connector extrusion 40, a connector extrusion 40 having two projection legs 44, as seen in FIGS. 5a and 6, and a connector extrusion 40 having a single projection leg 44 (an end-of-run connector), as seen in FIGS. 5b and 7. The two versions, however, are otherwise substantially the same and therefore, the reference numerals used are the same for both versions.

Like the panel extrusion 30, the connector extrusion 40 is also typically formed as single extruded piece and then cut according to the required lengths. The connector extrusion 40 includes: a groove 42 and at least one projection leg 44.

The groove 42 of the connector extrusion 40 is delimited by side walls 42a and a junction wall 42b that adjoins the two side walls 42a. In a non-limiting embodiment, it is preferred that a lower portion of each of the two side walls 42a extends past the junction wall 42b. In the version of the connector extrusion 40 with only one projection leg 44, the projection leg 44 extends from one of the two side walls 42a away from the groove 42. In the version of the connector extrusion 40 with a projection leg 44 extending from each side wall 42a, the two projection legs 44 extend in opposite directions away from the groove 42. Preferably, in a non-limiting embodiment, the projection legs 44 are substantially perpendicular to the side walls 42a from which the projection legs 44 extend.

As shown in FIGS. 6 and 7, panel assemblies are mounted to a structure by engaging the structure-side flange 32 of the panel extrusion 30 with the projection leg(s) 44 of the connector extrusion 40. FIG. 6 shows a cross-sectional view of the junction between two adjacent mounted panel assemblies 20. As mentioned above, a panel assembly 20 includes the panel 12 that is connected to a panel extrusion 30. Typically, the panel 12 is prepared from a planar panel that has been cut with a v-groove 50 (see FIG. 8) near each side edge and folded at the cut to make a return edge 12a and form a box shape. The preferred method of cutting the v-groove is described below. The return edge 12a of the panel 12 is typically 1" in width, but may be wider or narrower depending on the needs of the particular job. The panel extrusions 30 are correspondingly sized and cut and are typically attached to the inside corners of the box-shaped panel 12. Preferably, a fastener 24, such as a screw for example, is used to fasten the panel 12 to the panel extrusion 30. Additionally, a sealant 22 may be disposed between the panel extrusion 30 and the inside surface of the panel 12. The sealant 22 is preferably a silicone sealant.

In another non-limiting embodiment, the mounting system further includes: an air and water barrier layer 102, and a strip of foam tape 104. The order of the assembled components is as follows. The air and water barrier layer is typically adhered to the surface of the wall 100 and then the strip of foam tape 104 is adhered to the surface of the air and water barrier layer 102. The connector extrusion 40 is secured to the strip of foam tape 102 with a fastener 26 and engages the structure-side flange 32, securing the structure-side flange 32 to the strip of foam tape 102 as well. Thus, the panel assemblies 20 are secured to the wall 100.

The assembly shown in FIG. 7 is substantially the same as described with respect to FIG. 6, however, as mentioned previously, FIG. 7 depicts a single panel extrusion 30 and a connector extrusion 40 with only one projection leg 44. In addition, the panel insert 14 is secured only on one side by the insert strip holding portion 35.

As mentioned above, the complete installed mounting system 10 provides five seals that trap and drain water to the outside of the structure. The five seals are described below with reference to FIG. 6. The first seal is formed at the contact points of the outer surface of the insert strip 14 with the intermediate portion 33 of the panel extrusion 30. The second seal is formed at the contact points of the inner surface of the insert strip 14 with the insert support flange 36 over the gutter space, which is between the insert strip 14 and the connector extrusion 40. The third seal is formed at the contact point between the projection leg 44 of the connector extrusion 40 and the structure side flange 32 of the panel extrusion 30. The fourth seal is formed between the strip of foam tape 104 and the structure side flange 32. The fifth seal is formed between the strip of foam tape 104 and the air and water barrier layer 102. Accordingly, when all of the above components are properly installed, the mounting system has five seals to prevent water from entering the structure to which the panels are mounted.

Figure 8:
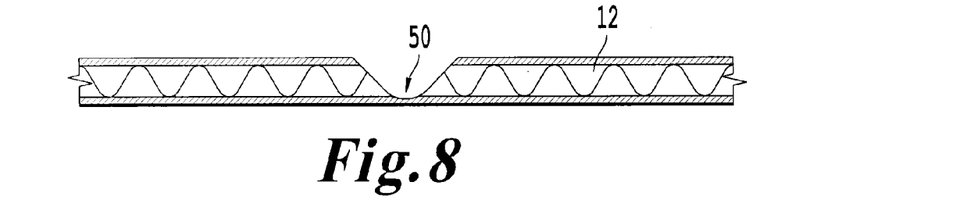
FIG. 8 is a cross-sectional view of a v-groove cut in a panel according to an exemplary embodiment of the invention.

FIG. 8 is a cross-sectional view of a v-groove 50 cut in a panel 12 to form the box shape. The v-groove 50 may be formed by any of a variety of ways known to those skilled in the art. In a non-limiting embodiment using a laminated panel 12, it is preferable that the v-groove 50 pass through one of the outer metallic sheets, all the way through the corrugated core, and then begin to cut away a small amount of the inner surface of the opposing metallic sheet. It is preferred to cut the v-groove 50 in the above-described manner so that the panel 12 bends easier and straighter, and does not leave a mark on and/or penetrate the outer surface of the opposing metallic sheet, which would ruin the panel 12.

Figure 9:
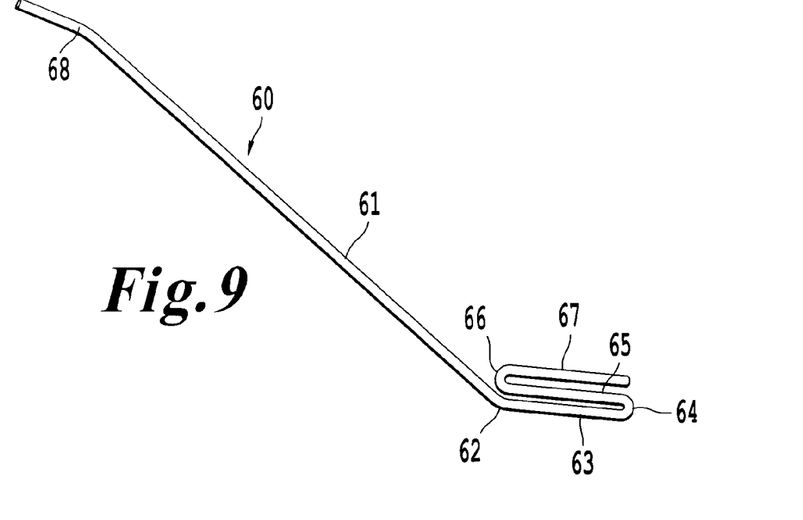
FIG. 9 is a perspective view of a spring clip according to an exemplary embodiment of the invention.

A spring clip 60 is depicted in FIG. 9. The spring clip 60 is used to hold in place narrow insert strips, which would otherwise rest so that the insert strip does not entirely cover the intermediate space between adjacent installed panel assemblies 20. The spring clip 60 is typically formed as a cylindrical thin rod and then bent to the desired shape, discussed herein. Preferably, the spring clip is an elastic metal, however, other elastic materials may be suitable. In one non-limiting embodiment shown in FIGS. 9-13, the spring clip 60 includes: an arm extension 61, a first bend 62, a first extension 63, a second bend 64, a second extension 65, a third bend 66, an third extension 67, and a fourth bend 68.

The arm extension 61 of the spring clip 60 extends away from the first extension 63 such that the first bend 62 is an angle between approximately 90 and 150 degrees, and preferably approximately 120 degrees. The second bend 64 connects the second extension 65 and the first extension 63. The second bend 64 forms a loop which allows the first extension 63 and the second extension 65 to be substantially parallel, however the second extension 65 extends from the second bend 64 in a plane that is distinct from the plane along which the first extension 63 extends. The third bend 66 forms a loop which allows the second extension 65 and the third extension 67 to be substantially parallel. Additionally, the third extension 67 may extend from the second bend 64 in substantially the same plane along which the second member 63 extends. The fourth bend 68, located at the end of the arm extension 61, prevents the spring clip from digging into the panel once the insert strip is installed.

Figure 10:
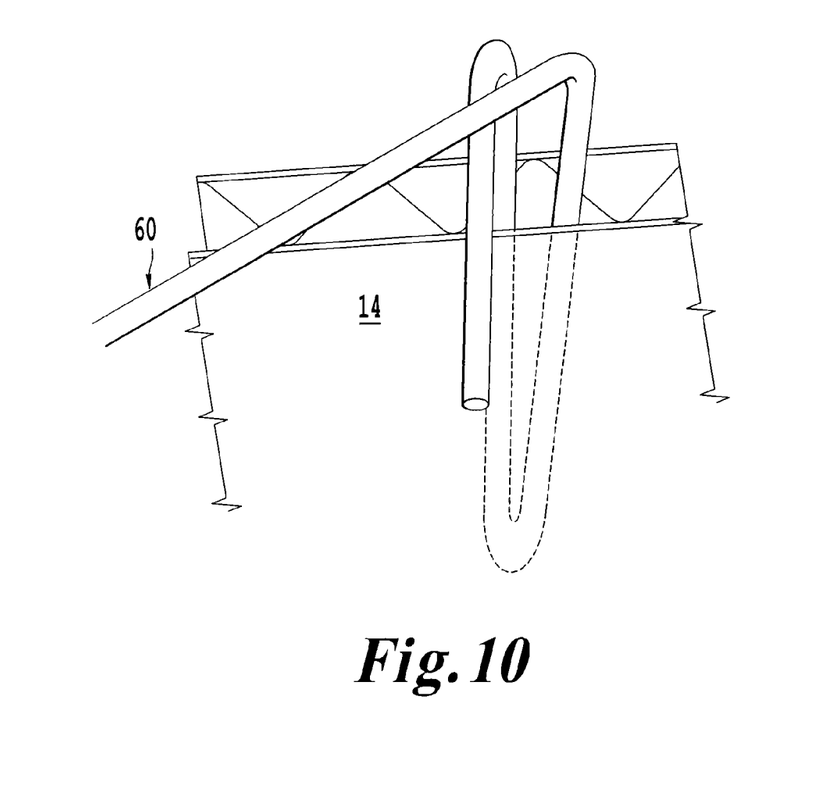
FIG. 10 is a perspective view of a spring clip inserted in a panel according to an exemplary embodiment of the invention.
Figure 11:
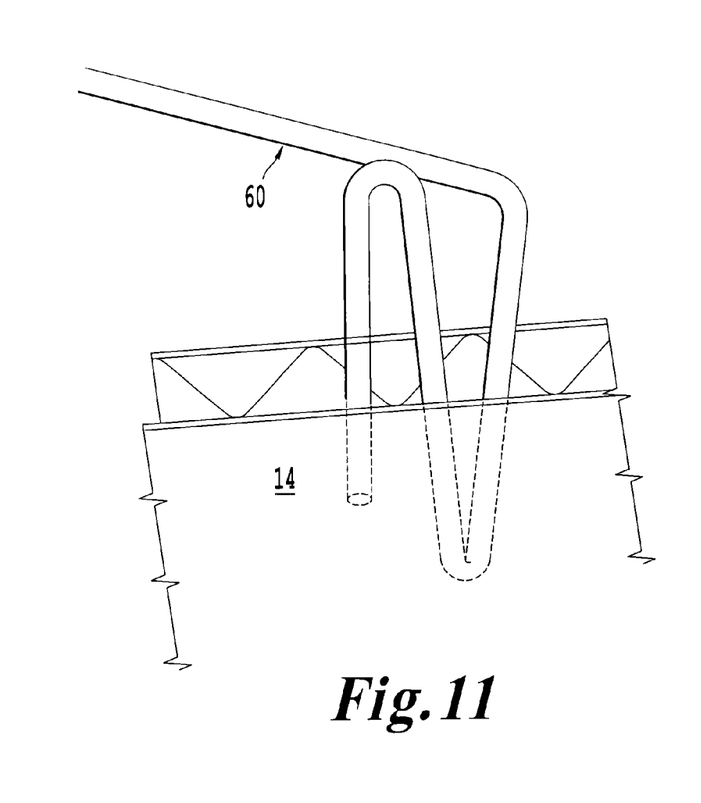
FIG. 11 is another perspective view of a spring clip inserted in a panel according to an exemplary embodiment of the invention.
Figure 12:
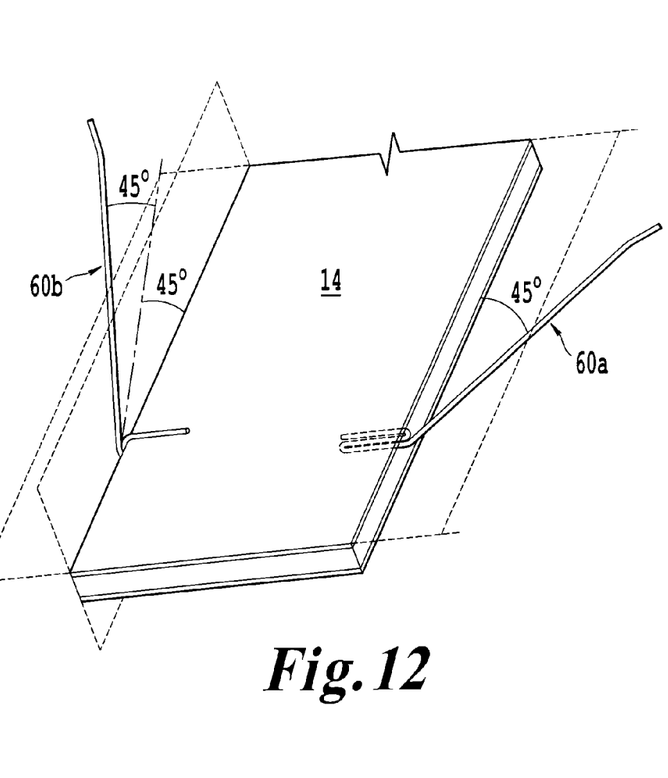
FIG. 12 is a perspective view of an insert strip with a spring clip in each side according to an exemplary embodiment of the invention.

FIGS. 10 and 11 show the spring clip 60 inserted into the side of an insert strip in two different positions, such that in the position shown in FIG. 10, the arm extension 61 extends in a first angled direction and in the position shown in FIG. 11, the arm extension 61 extends in a second angled direction. Further, in FIG. 10, the third extension 67 remains against the exterior surface of the insert strip such that only the first and second extensions 63 and 65 are inserted into the core of the insert strip. In FIG. 11, however, the third extension 67 is inserted into the core of the insert strip beside the first and second extensions 63 and 65. FIG. 12 further illustrates the positions shown in FIGS. 10 and 11, as the spring clips 60a and 60b are inserted into opposite sides of the same insert strip 14. Once inserted into the insert strip 14, the arm extensions 61 typically extend at approximately a 45° angle with respect to the edge of the insert strip 14 where the spring clips 60a and 60b are inserted.

The two different positions of insertion of the spring clips 60a and 60b, as shown in FIG. 12, cause the arm extensions 61 to hold specific positions with respect to the insert strip 14. Specifically, the arm extension 61 of spring clip 60a lies in the plane of the panel surface of the insert strip 14, at a position of 45° from the cut longitudinal edge of the insert strip 14. The arm extension 61 of spring clip 60b is positioned 45° away from the plane of the panel surface of the insert strip 14, and 45° away from the plane of the cut longitudinal edge of the insert strip 14, which is perpendicular to the plane of the panel surface of the insert strip 14.

Figure 13:
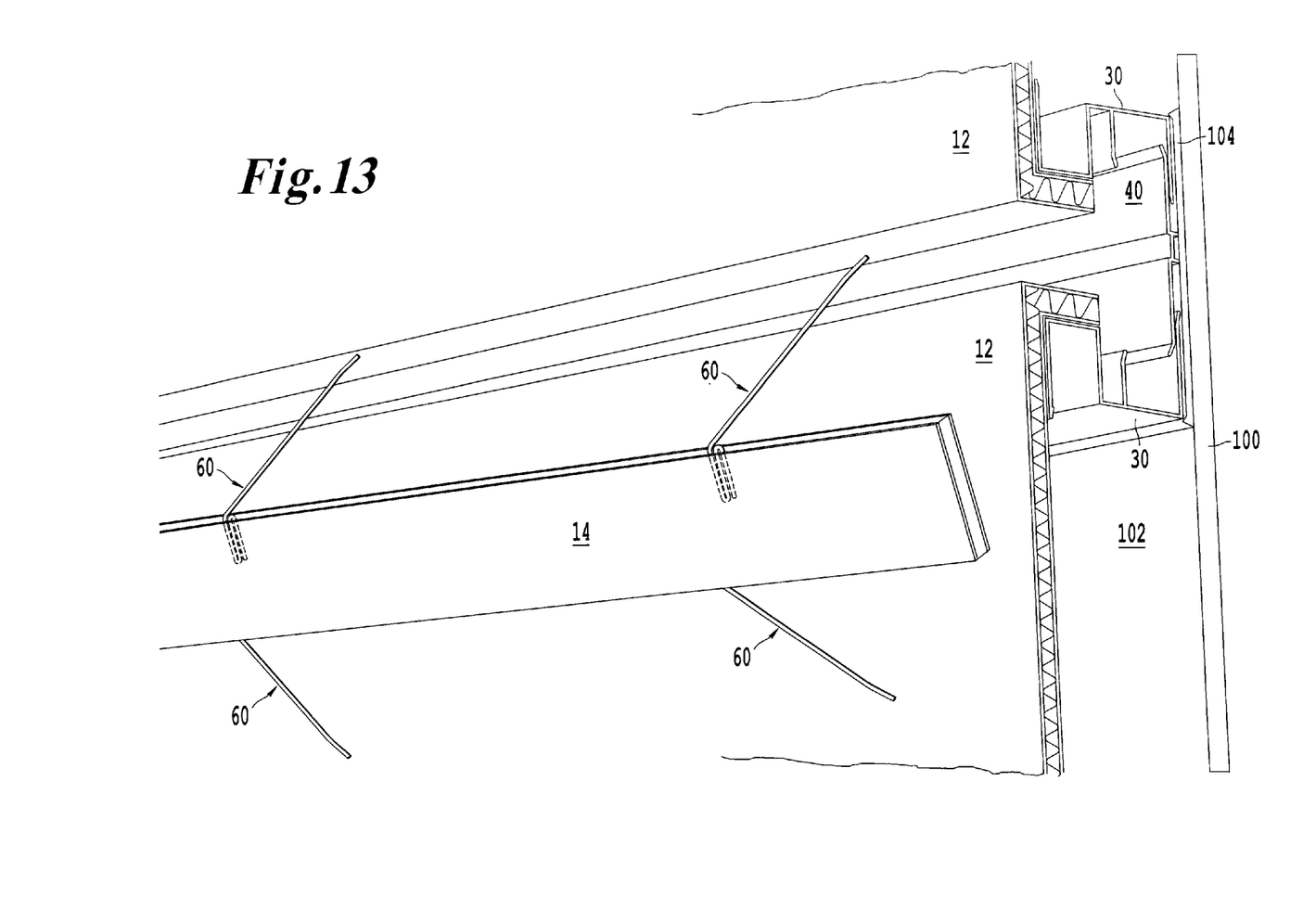
FIG. 13 is perspective view of an insert strip with multiple spring clips in each side of the insert strip according to an exemplary embodiment of the invention.

FIG. 13 shows an insert strip in position to be inserted between panel assemblies 20. The insert strip in FIG. 13 includes two spring clips 60 on each side.

Figure 14:
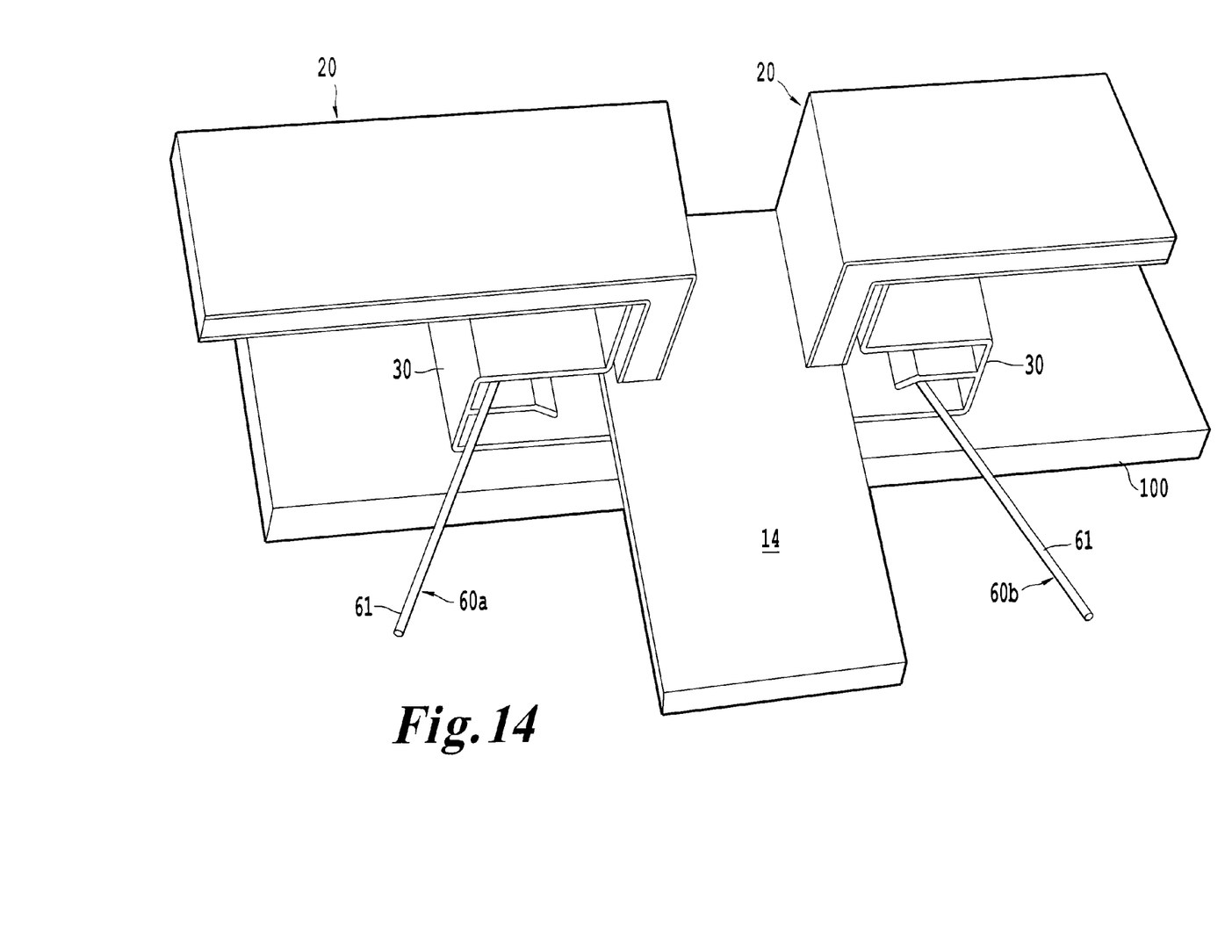
FIG. 14 is a perspective end view of an insert strip showing the ends of spring clips extending into the panel extrusions according to an exemplary embodiment of the invention.

As depicted in the cross-sectional view in FIG. 14, the insert strip 14 is inserted into the junction area between two panel assemblies 20. The arm extensions 61 of the spring clips 60 extend from the sides of the insert strip 14 and abut the panel extrusion 30 to place the insert strip between the two panel assemblies 20, thereby concealing the mounted connector extrusion 40.

Obviously, numerous modifications and variations of the present invention are possible in light of the above teachings. It is therefore to be understood that within the scope of the appended claims, the invention may be practiced otherwise than as specifically described herein.

The invention claimed is:

1. A mounting apparatus to mount a panel to a structural element, comprising:
    at least one panel extrusion that is attached to a back side of the panel such that the at least one panel extrusion is obscured behind the panel, and the at least one panel extrusion includes:
        an intermediate structure,
        a first extension structure extending from the intermediate structure in a first direction,
        a second extension structure extending from the intermediate structure in a second direction opposite to the first direction,
        a first flange extending from the first extension structure in a third direction,
        a second flange extending from the second extension structure in a fourth direction that is opposite to the third direction, and
        an insert support flange disposed proximate to the intermediate structure; and
    a connector extrusion that secures the at least one panel extrusion to the structural element, the connector extrusion includes a fastener receiving structure and a projection leg extending in a lateral direction away from the fastener receiving structure, and an outermost end of the connector extrusion in the lateral direction extends into a space formed between the second flange and the insert support flange.

2. The mounting apparatus according to claim 1, wherein a seal is formed between the projection leg of the connector extrusion and the second flange of the at least one panel extrusion.

3. The mounting apparatus according to claim 1, further comprising an insert strip to obscure at least the connector extrusion.

4. The mounting apparatus according to claim 3, wherein a seal is formed between an outer surface of the insert strip and the intermediate structure of the at least one panel extrusion.

5. The mounting apparatus according to claim 3, wherein a seal is formed between an inner surface of the insert strip and the insert support flange of the at least one panel extrusion.

6. The mounting apparatus according to claim 3, further comprising at least one spring clip to hold the insert strip.

7. The mounting apparatus according to claim 6, wherein the at least one spring clip includes:
    an arm extension,
    a first extension connected to the arm extension by a first bend,
    a second extension connected to the first extension by a second bend, and
    a third extension connected to the second extension by a third bend.

8. The mounting apparatus according to claim 7, wherein the arm extension of the at least one spring clip includes a fourth bend.

9. The mounting apparatus according to claim 7, wherein the first bend forms an angle between 90 and 150 degrees.

10. The mounting apparatus according to claim 7, wherein the first, second, and third extensions of the at least one spring clip are parallel to one another.

11. The mounting apparatus according to claim 7, wherein at least a portion of the first and the second extensions of the at least one spring clip are inserted into a core of the insert strip.

12. The mounting apparatus according to claim 7, wherein at least a portion of the first, second, and third extensions of the at least one spring clip are inserted into a core of the insert strip.

13. The mounting apparatus according to claim 7, wherein the arm extension of the at least one spring clip extends from a side of the insert strip and abuts the at least one panel extrusion.

14. The mounting apparatus according to claim 13, wherein the arm extension of the at least one spring clip extends at an angle of 45 degrees relative to a longitudinal edge of the insert strip.

15. A mounting system to mount a panel to a structural element, comprising:
    an air and water barrier layer;
    a strip of foam tape disposed on the air and water barrier layer; and
    a panel assembly including:
        the panel, and
        the mounting apparatus according to claim 1,
        wherein the connector extrusion is disposed on the strip of foam tape.

16. The mounting system according to claim 15, wherein a seal is formed between the strip of foam tape and the second flange of the at least one panel extrusion.

17. The mounting system according to claim 15, wherein a seal is formed between the strip of foam tape and the air and water barrier layer.

18. The mounting system according to claim 15, wherein the strip of foam tape provides a vent to control egress and ingress of at least one of air, water, and moisture between an inside and an outside of the mounting system.

19. The mounting system according to claim 15, wherein a plurality of seals of the mounting system prevent water from entering an inside of the mounting system and trap and drain water to an outside of the mounting system.

* * * * *